COLOR OR MONOCHROME TELEVISION RECEIVING SYSTEM

Filed May 1, 1950 4 Sheets-Sheet 1

INVENTOR
Harry Kihn
BY
Ohio J. Mitchell
ATTORNEY

COLOR OR MONOCHROME TELEVISION RECEIVING SYSTEM

Filed May 1, 1950 4 Sheets-Sheet 2

INVENTOR
Harry Kihn
BY
ATTORNEY

INVENTOR
Harry Kihn
BY [signature]
ATTORNEY

INVENTOR
Harry Kihn
BY [signature]
ATTORNEY

1

2,744,155

COLOR OR MONOCHROME TELEVISION RECEIVING SYSTEM

Harry Kihn, Lawrenceville, N. J., assignor to Radio Corporation of America, a corporation of Delaware Application May 1, 1950, Serial No. 159,288

20 Claims. (Cl. 178—5.4)

The present invention relates to receiving terminal apparatus and methods for utilizing time division multiplexed signals.

In more particularity, but not necessarily exclusively, the present invention relates to combination type receiving apparatus for successfully using either time division multiplex type signals or single channel non-multiplexed type signals. The present invention further relates to automatic mechanisms and methods for discriminating between time division multiplexed type signals and single channel non-multiplexed signals and automatically altering receiving terminal equipment and processes to most efficiently employ the particular type of signal being received.

Although the present invention is applicable to many branches of the time division multiplexing communication art, it perhaps finds no greater useful embodiment than in present-day color television systems. As is recognized by those skilled in the television art, one of the basic requirements for a commercially feasible color television system is that it be "compatible." By the term compatible it is meant that receiving apparatus designed for the color television system will also serve to successfully reproduce high quality black and white pictures when receiving ordinary black and white television signals.

Due to channel width limitations, virtually all proposed systems for color television are of the time sharing or time division multiplexed variety. As described in a recent article entitled "New Directions in Color Television," appearing in the December 1949 issue of Electronics on page 66, such systems successively transmit in chain fashion, bits of information corresponding to the different primary colors of the scene being televised. One such system known as the "dot multiplex" color television system is described in more detail in a pamphlet issued to the Federal Communications Commission dated February 1950 by the Radio Corporation of America, RCA Laboratories Division, the title of which is "Recent Developments in Color Synchronization in the RCA Color Television System." In the dot multiplex system the transmitted color television signal comprises a train of grouped pulses. The amplitude variations of the individual pulses in each group represent intensity variations of a different given component color in the televised scene. The pulses are recurrent at a rate of several megacycles or so. At the receiver some form of time division multiplex signal distribution system is necessarily used to segregate, for example, all the blue pulses, all the red pulses and all the green pulses. The segregated pulses of this exemplary red, green and blue system are then respectively applied to separate red, green and blue image reproducing channels. The combined effect of all the primary color images are then either optically or electronically arranged to reproduce a complete color television scene.

In order to properly time distribute these received pulses to proper corresponding primary color reproducing channels, it is, of course, necessary to maintain the receiver distribution system in precise synchronism with the time multiplexing equipment at the transmitter. As described in the last mentioned article, this may be done by sending, along with the color television signal, a series of "burst" synchronizing signals. Each burst contains several cycles of the frequency at which signal distribution action at the receiver is to take place.

2

Although generally speaking, a "dot-multiplex" type television receiver is to a degree inherently compatible to receive standard black and white television signals, it is plain that there exists one main difficulty. This arises from the fact that during reception the standard television signal is effectively "chopped up" by the signal distributor in the receiver at a random rate. This chopping is wholly random since in a standard television signal there is no burst component to synchronize the color receiver distributor. It accordingly has been found that a dot multiplex type television receiver when receiving a standard black and white television signal may produce visible interference patterns throughout the picture. These patterns become more pronounced when the random, drifting, frequency of the receiver multiplex distributor happens to be near a harmonic of the standard black and white line repetition rate.

Accordingly, it is the purpose of the present invention to provide improved and more versatile receiving terminal apparatus and method for time division multiplex communication systems. Such appartus is to not only successfully receive multi-channel multiplex signals, but also a standard non-multiplexed single channel signal without degrading the quality of the single channel information.

A further object of the present invention is to provide an improved form of color television receiver which automatically distinguishes between color television signals of the "dot multiplex" variety and standard black and white television signals so as to effectively disable the time division multiplex distributing system of the receiver during the reception of standard black and white signals.

In accomplishing the above objects, the present invention, as applied for example to color television receivers, may take at least two important forms. In both forms, however, an indicating voltage must be developed which differentiates between time multiplex signals and standard black and white picture signals. This may be accomplished by separating the burst component of the incoming signal when receiving "dot-multiplex" color signals. The burst component may then be rectified to produce an indicating voltage. This indicating voltage is then applied to a circuit for effectively disabling the receiver time division multiplex distribution system whenever no burst is received (i. e. when receiving any signal other than "dot-multiplex" color television signals).

In the first mentioned form of the invention, the indicating voltage is used to actually stop the time distribution action in the receiver and apply the incoming signal to all color channels at the same time.

In the second mentioned form of the invention, the indicating voltage is used to speed up the frequency of time distribution action in the receiver to frequency value which the image reproducing means in the color receiver will not pass. This speed up, of course, is invoked only when receiving signals other than "dot-interlace" color television signals.

In the first of the mentioned forms of the present invention in which time distribution action of the receiver is actually stopped, certain technical problems arise which are of major importance. In that form of the present invention in which the control oscillator for the time distributor of the receiver is itself disabled in accordance with an indicating voltage, special care must be used to insure sufficient speed in circuit action. Most prior art oscillator stopping circuits are not suitable. See, for example, the type shown and described in a pamphlet entitled "Synchronization for Color Dot Interlace in the RCA Color Television System" issued to the Federal Communications Commission in October 1949 and prepared by the RCA Laboratories Division. In this stopper circuit and as in most prior art arrangements of similar nature, the oscillator to be controlled is normally off and is keyed on by a controlling pulse. This gives rapid circuit action. In the present invention, however, need arises for an oscillator that is normally on and must be turned off by removing certain operating potentials from the oscillator. Time constant considerations come in to make the obtaining of rapid response in such a circuit rather difficult.

Thus, it is a purpose of the present invention to provide a novel and improved stopping circuit for quickly disabling electron tubes while functioning in electronic circuits.

In further accord with the above purpose, it is another purpose of the present invention to provide a quick-acting disabling circuit for electronic oscillators for the purpose of accurately controlling their on and off periods.

Other ways may be used for effectively disabling the time distribution action of a color receiver in response to the above-described "burst" or different components of received signals without departing from the scope of the present invention. However, experience has shown that when the time division distribution action of a conventional color television receiver distribution system is stopped entirely and/or received signals are effectively by-passed around the distributor system, a color unbalance may occur. This is due to the fact that upon stopping the distribution system compensation is no longer needed for any inherent irregularities in the amplitudes of signal supplied to each receiver channel by the distributor. This color unbalance will prevent the reproduction of a pure black and white picture unless special adjustment is made of the gain in each color channel of the receiver.

Therefore, another object of the present invention is to provide time division multiplex receiving apparatus which is not only capable of effectively disabling its own time division distribution action when receiving non-multiplexed signals, but automatically compensates its intelligence reproducing channels to which signal is ordinarily distributed, for any inherent irregularities in the time division signal distribution system.

It is, accordingly, another purpose of the present invention to provide dot multiplex type color television receiver and method which upon receiving standard non-multiplexed black and white television signals not only disables its time division signals distribution system but automatically readjusts the color balance of the color channels to produce a pure black and white picture.

In one of its forms as applied to a dot-interlace color television receiver, in accordance with the present invention, in realizing these latter objects, it is contemplated using the burst indicating voltage to adjust the background brightness of each reproducing channel to overcome any discrepancies in color balance due to the signal distributor of the receiver.

In the practice of the present invention, need further arises for a convenient method and apparatus for manually adjusting the color balance of the picture reproduced by the receiver. As above indicated, this is to insure perfect color reproduction as well as a pure black and white picture during reception of black and white signals. To achieve this color balance the present invention uses a novel arrangement which controls the keying pulse amplitude applied to the gate tubes in the signal distributor system of the receiver. The convenience and simplicity of this arrangement, as hereinafter will be more fully described, is noteworthy.

Therefore, it is a further object of the present invention to provide an improved color balance control circuit for color television receivers, especially of the type employing the novel features of the present invention hereinabove indicated and hereinafter more fully illustrated and decribed.

Other objects, forms and features of advantage of the present invention as well as a more complete understanding of its nature and operation will appear from a reading of the following description when considered in connection with the accompanying drawings, in which.

Figure 1:
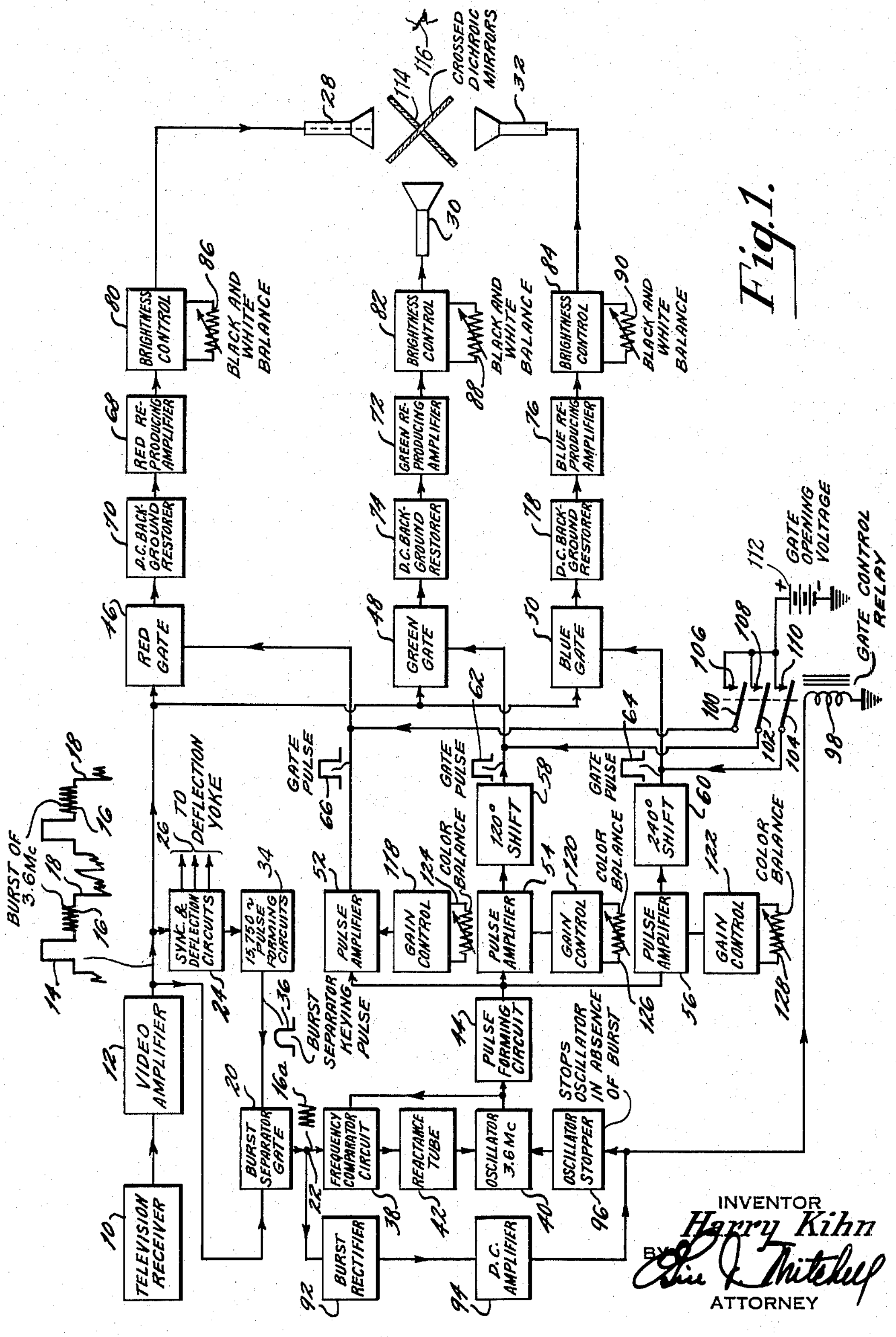
Figure 1 is a block representation of one form of the present invention as applied, for example, to a dot-multiplex color television receiver.

Turning now to Figure 1, there is indicated by a block 10 a standard type television receiving circuit capable of receiving and demodulating standard black and white television transmission or dot-multiplex color television transmission. The demodulated signal developed by the television receiver 10 is applied to the video amplifier 12. The demodulated signal 14 represents the dot-multiplex type color signal shown and described in the March 1950 issue of "Tele-Tech" on page 38. The signal 14 is substantially identical in appearance to standard black and white video transmission except that the dot-multiplex signal 14 carries a burst component 16 on the back porch of the horizontal blanking pedestal 18. In one of the preferred forms of a dot-multiplex color television system, the burst 16 comprises a plurality of cycles of a frequency harmonically related to the line frequency of a standard television system. In Figure 1, this is indicated as approximately 3.6 megacycles.

In accordance with one type of dot-multiplex operation, the burst 16 is removed from the signal 14 by means of a burst separator gate 20. The burst separator gate is a standard gate circuit which is keyed on only during the period in which the burst 16 is present. Thus, at the output lead 22 of the gate 20 there will appear separated bursts **16*a*. The actual keying of the burst separator 20 at the proper time to pass only the burst 16*a* is, for example, accomplished by a signal derived from the deflection circuits 24. An output signal of the deflection circuits 24 of the receiver is adapted to synchronize a pulse forming circuit 34 of any convenient form which is adapted to produce the keying pulse 36 for the burst separator 20. This pulse forming circuit 34 may be of the multivibrator type. The width of pulse 36 is made substantially equal to the duration of the burst signal 16. Other ways of obtaining keying pulses for the burst separator can, of course, be used. The usual output signals at the leads 26 of the deflection circuits are, of course, connected to deflection yokes (not shown) for properly deflecting the scanning beams in the kinescopes 28, 30 and 32**, later to be discussed.

Still considering the conventional features of dot-multiplex system, in Figure 1, the separated burst **16*a* is applied to one input lead of a frequency comparator circuit 38. The frequency comparator circuit 38 is adapted to compare the output frequency of an oscillator 40 with that of the burst 16*a* so that through the agency of reactance tube 42 the nominal 3.6 megacycle oscillator 40 may be kept at the exact frequency desired. The output signal of oscillator 40 is applied to the pulse forming circuit 44 which produces gating pulses for the normally closed color gates 46, 48 and 50**. By "closed" it is meant that the gate is closed to the passing of signals without the coincident arrival of a gating pulse or that it will not pass signal. From an electrical circuit path standpoint, a "closed" gate would thus be an "open" circuit. The output signal of the pulse forming circuit 44 is applied to the red, green and blue gates 46, 48 and 50 respectively through corresponding pulse amplifiers 52, 54 and 56. Delay networks 58 and 60 shift the phase of gating pulses 62 and 64 so that they are respectively 120 degrees and 240 degrees out of phase with gating pulse 66. The demodulated signal 14 also is applied to the gates 46, 48 and 50. The red, green and blue gates are serially connected in the red, green and blue image reproducing channels, each of which terminates in a respective kinescope 28, 30 and 32. Thus, the demodulated signal 14 is applied to the red, blue and green channels only during the time intervals in which the red, green and blue gates are rendered open or conducting by the gating pulses 66, 62 and 64.

Since the gating pulses 66, 62 and 64 follow each other successively in time, it is clear that the red, green and blue gates will be opened in a corresponding manner. Thus, the demodulated signal 14 will be first applied to the red reproducing channel amplifier 68 via the background restorer 70. Next, the signal 14 will be applied to the green reproducing channel amplifier 72 via the direct current (D.-C.) background restorer 74. After the green gate closes, the blue gate 50 is opened by the pulse 64 and the signal 14 is applied to the blue reproducing channel amplifier 76 via the background restorer 78. Suitable brightness controls 80, 82 and 84 are respectively placed in the reproducing channels. Each brightness control is provided with a manually variable balance adjustment indicated at 86, 88 and 90, respectively.

The description thus far has, as indicated, been of elements typical of the dot-multiplex color television system now known in the art and described in the above-reference publications.

According to the present invention, however, the separated burst *16a* at the output terminal 22 of the separator 20 is applied to means for developing an indicating voltage representing the burst. In Figure 1 this means is, for example, shown as a burst rectifier 92 whose developed D.-C. component is applied to a D.-C. amplifier 94. The indicating voltage appearing at the output lead of the D.-C. amplifier 94 is then applied to an oscillator stopper 96 which completely disables the oscillator 40 in the absence of burst signal. That is to say, should the receiver 10 not be receiving a dot-multiplex type color television receiver, the oscillator stopper circuit 96 will disable the oscillator 40 so that no keying pulse will appear at the output lead of the pulse forming circuit 44.

In further accord to the present invention, the output signal of the D.-C. amplifier 94 is also applied to means 98 for opening all of the signal gates 46, 48 and 50 at the same time. This gate opening means effectively conditions these gates so that signal 14 is applied to the inputs of the restorers 70, 74 and 78 all at the same time. This gate opening means is shown, for example, as a gate control relay 98, shown in its energized position. The gate control relay is provided with three armatures 100, 102 and 104. Each of these armatures in the absence of burst are pulled away from their respective contacts 106, 108 and 110. In the absence of the burst 16, the indicating voltage appearing at the output of the D.-C. amplifier 94 is such as to allow the relay to become de-energized and allow the armatures to touch the contacts 106, 108 and 110. This applies a gate opening voltage from battery 112 to all of the gates 46, 48 and 50. The value of the gate opening voltage from battery 112 will be at least as great as the voltage represented by the peak amplitude of the gate pulses 62, 64 and 66.

The operation of the present invention shown in Figure 1 is substantially as follows: Upon normal reception of a dot-multiplex color television signal having burst component 16 as indicated by the waveform 14, the burst will be rectified by the rectifier 92 to produce an indicating voltage at the output lead of the amplifier 94. This will then energize the gate control relay 98 and withhold gate opening voltage from each of the gates 46, 48 and 50. These gates will then be closed and no signal will pass through them. The developed indicating voltage at the output lead of the amplifier 94 also operates on the oscillator stopper 96 to permit the oscillator 40 to function. This, of course, allows the pulse forming network 44 to feed the pulse amplifiers 52, 54 and 56 with proper gate pulse waveforms. Hence, the red, green and blue gates 46, 48 and 50 will be consecutively opened for brief periods corresponding to the widths of the gate pulses 62, 64 and 66. Each of the color reproducing channels will then produce a color image on the face of the corresponding kinescopes 28, 30 and 32. These images are mixed by crossed dichroic mirrors 114 for viewing by the eye 116. The color balance in the picture may be controlled by adjusting the gain of each of the pulse amplifiers 52, 54 and 56. Separate gain controls 118, 120 and 122 with manual adjustments 124, 126 and 128 are shown for this purpose. If the gain of a given pulse amplifier is increased, the gate pulse amplitude will also increase. This increase in gate pulse will then cause the amplitude of that portion of signal 14 conducted by the gate to appear of greater amplitude. This will then mean that the particular color component passed by the gate will be brighter in the reproduced color picture.

In further accordance with the operation of the present invention, should the receiver 10 be tuned to a black and white television channel so that in lieu of demodulated color signal 14, a standard black and white video signal was applied to the burst separator gate 20, then no burst would be applied to the rectifier 92. The gate control relay 98 would be de-energized and the gate opening voltage from battery 112 would be applied to the gates 46, 48 and 50. This would simultaneously open all of the gates for the passage of video signals. The oscillator stopper 96 would conjointly disable the oscillator 40 to prevent the production of keying pulses. The black and white video signal appearing at the output circuit of the amplifier 12 would then be applied to all of the color reproducing channels at the same time. Color balance of the channels to produce a perfect black and white picture may then be accomplished by the brightness balance controls 86, 88 and 90 in each of the channels.

It is thus seen that the present invention, in the form described, eliminates possibility of received black and white signals from being interfered with by the signal distributing system of the color receiver. In the absence of the present invention, received black and white signals would be effectively chopped up at a 3.6 megacycle rate by the gates to produce objectionable interference patterns on the face of the kinescopes 28, 30 and 32. These interference patterns arise from beat frequency products caused by the oscillator frequency working against harmonics of the 15,750 cycle horizontal line frequency in the receiver.

Figure 2:
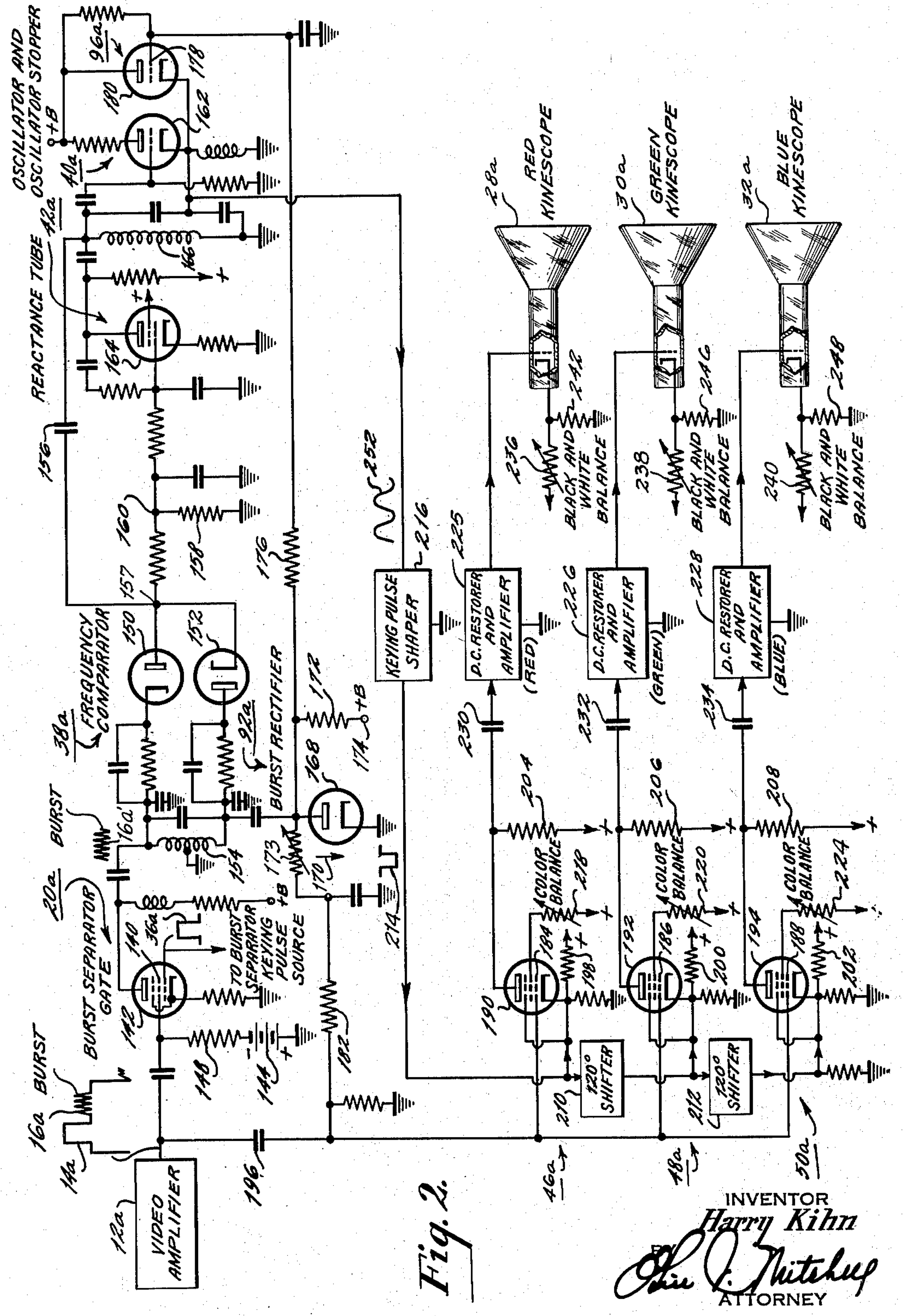
Figure 2 is a combination block and schematic representation of another form of the present invention as applied to a dot-multiplex type of color television receiver.

The arrangement in Figure 2 illustrates in more detail some of the features of the invention set forth in Figure 1, as well as other variations. For example, in Figure 2 the demodulated signal *14a* appearing at the output of video amplifier *12a* is capacitively coupled to the screen grid 140 of tube 142. The tube 142 operates as the burst separator gate 20 shown in Figure 1. In Figure 2, this burst separator gate is given the reference designation *20a*. A battery 144 connected through resistance 148 to screen grid 140 biases the tube 142 to cutoff. The positive-going burst separator keying pulse *36a* at the control grid establishes conduction in tube 142 for the duration of the pulse. Since pulse *36a* is synchronized with occurrence of the bursts, there will then appear separated bursts *16a′* at the output circuit of the gate tube 142.

The frequency comparator circuit *38a* of Figure 2 corresponds in function to block 38 in Figure 1. Here in Figure 2 two diodes 150 and 152 are connected in a typical bridge rectifying circuit. Burst signal 16a' is applied to the diodes 150 and 152 by means of tapped inductance 154. For purposes of output frequency comparison, energy from the oscillator 40a is fed via capacitor 156 to the junction 157 of the diodes 150 and 152. The average direct voltage then appearing across resistor 158 will be an indication of the frequency difference between the frequency of the oscillator 40a and the frequency defined by the burst 16a'. The control voltage developed by the frequency comparator circuit will, therefore, appear at the terminal 160. The oscillator 40a comprising discharge tube 162 is of the conventional Colpitts variety. Its frequency is controlled by the shunt reactance tube 164 placed across the oscillator tank coil 166. The complete reactance tube circuit, including discharge tube 164, is indicated in Figure 2 as 42a. The complete oscillator is indicated as 40a. These correspond respectively to the blocks 42 and 40 of Figure 1. Detailed operation of the frequency comparator circuit, as well as the reactance tube and oscillator, is not thought to be necessary here in view of the further information on these subjects available in The Radio Engineering Handbook by Keith Henny, 3rd edition, 1941.

As described in connection with Figure 1, according to the present invention some of the separated bursts are rectified to produce an indicating voltage. In the arrangement of Figure 2 this is accomplished by means of the diode 168 connected as a burst rectifier. The entire burst rectifier circuit is indicated as 92a to correspond to the block 92 of Figure 1. The separated burst is rectified by the diode 168 to produce current conduction in the direction of the arrow 170. The anode of the diode 168 is connected through high resistance 172 to a source of positive B potential 174. The upper terminal of resistor 172 is then connected through resistor 176 to the grid 178 of discharge tube 180. The connections of discharge tube 180 are that of an oscillator stopper circuit and have been labelled as 96a in Figure 2 to correspond to the block 96 in Figure 1. The particular form of the oscillator stopper circuit here shown is well known. However, its mode of control is novel to the present invention. This control will be fully considered hereinafter.

The upper terminal of the burst rectifier load resistor 172 is further coupled via resistor 182 to the control grids 184 and 186 and 188 of the color gate tubes 190, 192 and 194. The complete circuitry surrounding each of these color gate tubes have been referenced in Figure 2 as 46a, 48a and 50a to correspond to the red, green and blue gates 46, 48 and 50 of Figure 1. Incoming video signal 14a is also applied to these control grids 184, 186 and 188 through the capacitor 196. The bias on each of the color gate tubes is adjusted by selecting the value of resistors 198, 200 and 202 so that each gate tube is at plate current cutoff when the burst 16a is present. Thus, no video signal will occur at gate tube load resistors 204, 206 and 208 until these gate tubes are rendered conductive. As is well known in the time multiplex art, these gate tubes may be rendered successively conducting by applying negative-going gate pulses to the cathodes of each of these tubes. The gate pulse applied to the gate tube 192 is shifted 120 degrees from that applied to tube 190 by means of the phase shifter 210. Correspondingly, the keying of tube 194 is further delayed by the 120-degree phase shifter 212. As described in connection with Figure 1, the master keying pulse 214 is delivered from the keying pulse shaper 216 whose drive signal is obtained from the cathode of the oscillator tube 162. Shaping circuits for converting sine waves to square waves are in abundance throughout the art and need no description herein. For examples of suitable shaping networks reference is made to the book "Ultra-High Frequency Techniques" by J. G. Brainard, Glenn Koehler, Herbert Reich, and L. F. Woodruff.

According to the present invention, the screen potential of each gate tube 190, 192 and 194 is made variable by means of the rheostats 218, 220 and 224. In this way the amplitude of signal passed with each gate upon conduction may be controlled. The rheostats 218, 220 and 224 are labeled as color balance controls and are functionally the counterparts of gain control circuit 118, 120 and 122 of Figure 1. The signals passed by the respective red, green and blue gates 190, 192 and 194 are then applied to the amplifiers 225, 226 and 228. This is done through the respective coupling capacitors 230, 232 and 234. The red, green and blue amplifiers are supplied with D.-C. restorer circuits for establishing a proper background level for each of the reproduced color images. Typical video amplifier and D.-C. restorer circuits may be found in an article entitled "Television D. C. Component" by Karl R. Wendt appearing in the RCA Review for March 1948. The brightness controls 80, 82 and 84 in Figure 1 for purpose of black and white balance are shown in Figure 2 as rheostats 236, 238 and 240. As is common, such brightness controls vary the grid-cathode bias on each kinescope by controlling the voltage drop across the cathode resistors 242, 246 and 248.

The operation of the present invention in accordance with Figure 2, with the exception of a few minor variations, is substantially the same as described with respect to Figure 1. During the reception of a color signal such as 14a having a burst component 16a, the burst rectifier 168 will act to rectify positive-going peaks of the separated burst 16a'. This will cause the voltage at the upper terminal of resistor 172 to drop in a negative direction. By proper adjustment of potentiometer 173 this drop is made sufficient to render the oscillator stopper tube 180 nonconductive, or substantially so, so that the oscillator tube 162 may freely sustain oscillation. The output wave 252 of the oscillator will then cause gating pulse 214 to appear at the output of the pulse shaper 216. The voltage drop across resistor 172 is also conveyed via resistor 182 to the control grids of gate tubes 190, 192 and 194. Bias potentials are so fixed that this drop in voltage causes all the gate tubes to be biased at cutoff, when a color burst 16a is present. The gates tubes are then rendered conductive only by negative-going gate pulses 214 applied to their cathodes. Under these conditions the signal distributing system comprising the gates 46a, 48a, and 50a will operate in a conventional time division multiplex signal distributing manner. Appropriate color signal information will be applied to each color channel to produce a color image. Balance of the color image may be obtained by varying the screen potential on each of the gate tubes as described hereinbefore. Hence, during the reception of a color signal the receiving circuit will operate as a typical dot multiplex color television receiver of a type described in the article "Six Megacycle Compatible High Definition Color Television Systems" appearing in the RCA Review for December 1949.

If, however, according to the present invention the arrangement in Figure 2 should be supplied with a standard black and white television signal, the circuit would automatically adjust itself as follows: No burst would be rectified by the diode 168 since no burst exists on a standard black and white signal. The voltage in the upper terminal of resistor 172 will be higher and thereby will cause the oscillator stopper tube 180 to conduct. This will effectively load down the oscillator tube 162 and prevent the oscillator from functioning. Since the oscillator does not function, no gating pulse 214 will be produced, and the gating tubes 190, 192 and 194 will not thus be alternatively keyed.

The positive-going increase in voltage across resistor 172 also causes the bias on the control grid of the gate tubes 190, 192 and 194 to increase in a positive direction to a point allowing conduction to each of the tubes 190, 192 and 194. These tubes therefore act as amplifiers for the video signal appearing at the output of the amplifier 12*a*. Thus, the time multiplex distribution action has been effectively disabled. Each of the red, green and blue channels will then reproduce the same signal and will, assuming proper color balance, produce a black and white picture for viewing by the eye. The crossed dichroic mixing system of Figure 1 has not been shown in Figure 2, but it or its equivalent will be understood to be provided.

The embodiment of the present invention shown in Figure 2 is of the general type known in the art as a low level signal distribution arrangement. "Low level" in this sense merely means that the signal is distributed to three separate color reproducing channels at a relatively low amplitude. This requires separate amplifiers such as 225, 226 and 228 to amplify the signal in each channel sufficiently to operate the kinescope. However, the principles of the present invention are also applicable to signal distribution systems of the "high level" variety. With respect to color television, this means that the color signal is time distributed to the respective color kinescopes at a signal level high enough in amplitude to operate the kinescopes directly. This eliminates the necessity and expense of separate color channel amplifiers.

Figure 3:
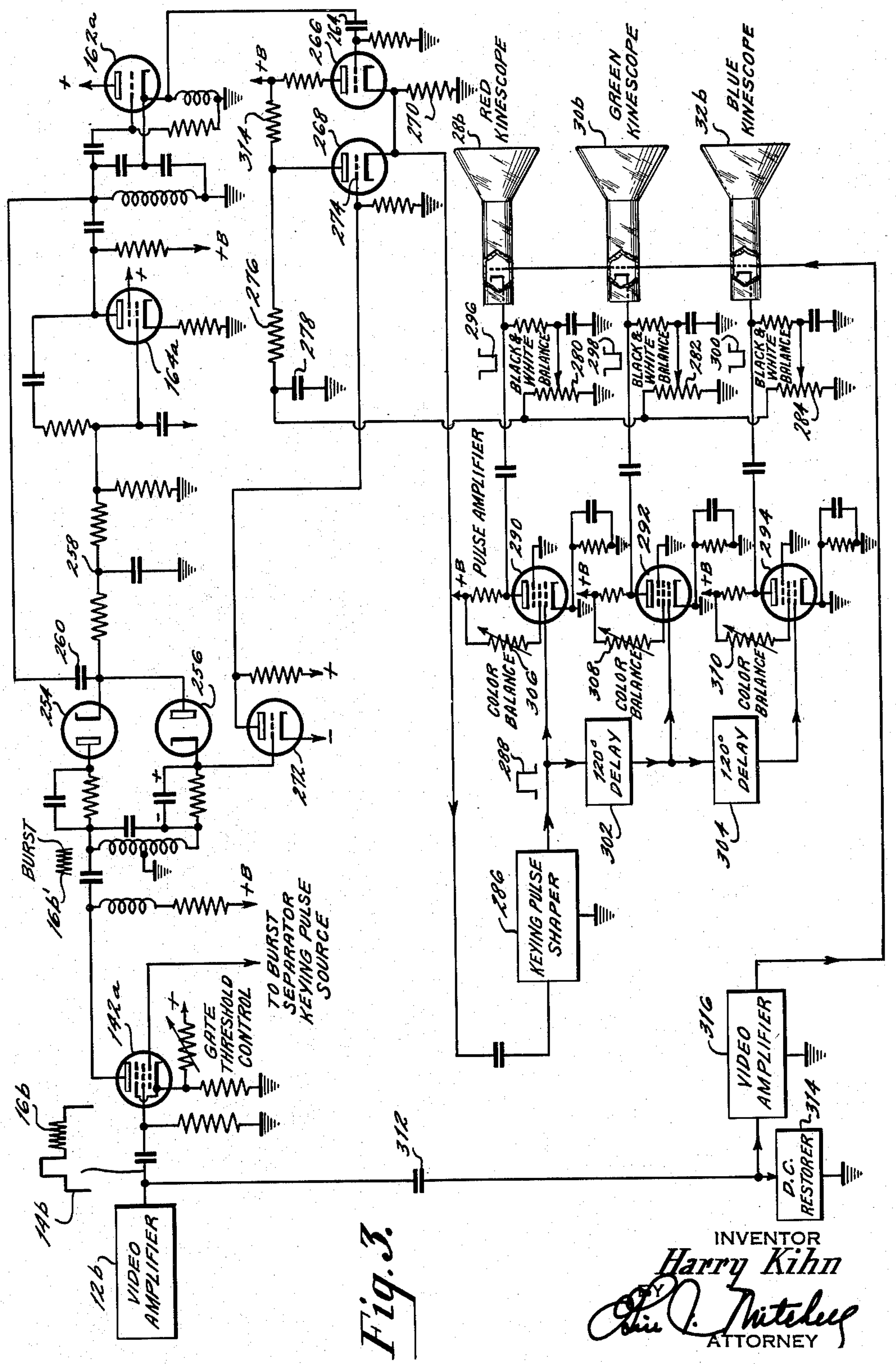
Figure 3 is a combination block diagram and schematic representation of another form of the present invention.

The embodiment of the invention shown in Figure 3 illustrates the application of the present invention to a high-level signal distributing system as employed in a dot-multiplex color television receiver. In Figure 3, the video amplifier 12*b* is shown as delivering a dot-multiplex color television signal 14*b* with a burst component 16*b*. The burst 16*b′* is separated from the signal 14*b* by means of the burst separator tube 142*a* in a manner similar to that shown and described in Figure 2. The burst 16*b′* is then fed to a frequency comparator circuit using diodes 254 and 256. The control voltage developed by the comparator circuit appears at output terminal 258 thereof. The oscillator voltage developed by the oscillator tube 162*a* is applied to the comparator circuit via the coupling capacitor 260. The frequency of the oscillator 162*a* is controlled by the reactance tube 164*a* in a manner similar to that described with respect to Figure 2. It will be noted that the polarization of the diodes in the frequency comparator circuit have been reversed, for the purpose of illustrational simplicity.

The arrangement in Figure 3 thus far described is substantially the same as that shown in Figure 2. In Figure 3, however, no oscillator stopper tube is provided. The output voltage of the oscillator tube 162*a* is capacitively coupled via capacitor 264 to a buffer tube 266. The buffer tube merely isolates the oscillator from the remaining ones of the television receiver circuits. In lieu of an oscillator stopper, there is then provided a buffer control tube 268. The buffer control tube 268 bears the same relation to the buffer amplifier 266 as did the oscillator stopper tube 180 to the oscillator tube 162 in Figure 2. That is to say, when the buffer control tube 268 is rendered sufficiently conductive the buffer amplifier 266 is virtually disabled so that no oscillator voltage is communicated thereby. This effect can be seen to follow from the fact that conduction of current by tube 268 causes a greater voltage drop across the common cathode resistor 270 which will at some point cause plate current cutoff of tube 266.

Also, the embodiment of Figure 3 differs from that shown hereinbefore in the form of the burst rectifier means employed. Advantage is taken of the fact that the standard frequency comparator circuit shown in both Figures 2 and 3 being of a bridge nature, may be used to obtain rectified burst information. This is done as shown in Figure 3. Voltage appearing at the cathode of the diode 256 in the frequency comparator circuit will, of course, fluctuate in direct accordance with rectified burst component. The voltage at the cathode of tube 256 may be applied to the grid of the D. C. amplifier tube 272 for amplification and application to the grid 274 of buffer stopper tube 268. Plate potential of the buffer stopper tube 268 is in accordance with the present invention applied through the filter network 276 and 278 to the potentiometers 280, 282 and 284 associated with the cathode circuits of the kinescope 28*b*, 30*b* and 32*b*. The actual cathodes of these kinescopes are connected with the sliding arms of each of these potentiometers.

The output wave of the oscillator buffer 266 in Figure 3 is also applied from the cathode resistor 270 to a keying pulse shaper 286 which provides at its output lead a positive keying pulse 288. The pulse 288 is of substantially the same nature as pulse 214 of Figure 2 except that it is of opposite polarity. The pulse 288 is applied to the control grids of pulse amplifier tubes 290, 292 and 294 which deliver negative-going keying pulses 296, 298 and 300 to the respective cathodes of the red, blue and green kinescopes. The pulses 296, 298 and 300 are staggered in time as previously described through the use of the 120-degree delay networks 302 and 304. In further accord with the present invention, the screen grid potential on each of the pulse amplifiers is made adjustable by the potentiometers 306, 308 and 310 for purposes of color balance. Video signals appearing at the output lead of the amplifier 12*b* are coupled by a capacitor 312 to a D.-C. restorer 314 which, in turn, is coupled to a standard video amplifier such as 316. The output signal of the video amplifier is applied directly to the control electrodes of the red, green and blue kinescopes 28*b*, 30*b* and 32*b*.

The operation of the present invention in accordance with Figure 3 is as follows: The black and white balance potentiometers 280, 282 and 284 are so adjusted that the kinescopes 28*b*, 30*b* and 32*b* are at beam current cutoff when color bursts 16*b* are present. This is for the conditions attending the reception of a dot-multiplex color television signal such as 14*b*. Under such conditions, the burst separated 16*b′* as rectified by the diode 256 will cause the grid of tube 272 to assume some net operating potential with respect to its cathode. Thus, the grid of the D.-C. amplifier 272 will be more positive with respect to ground. This will in turn define some net operating potential for the grid 274 of the buffer stopper tube 268, which potential is adjusted so that the tube 268 is rendered non-conductive. During the reception of a color signal, therefore, the buffer tube 266 will pass oscillator voltage to the keying pulse shaper 286. Also, the anode of the buffer control tube 268 will assume its most positive potential since little tube current is flowing through its load resistor 314.

The keying pulse 288 appearing at the output lead of the pulse shaper 286 will then be amplified by the pulse amplifiers 290, 292, and 294 to negatively pulse the cathodes of the kinescope 28*b*, 30*b* and 32*b*. The amplitudes of these negative going pulses 296, 298 and 300 are adjusted so that the beam current in the kinescope is reestablished only for their duration. Thus the information applied to the grids of the kinescopes will be visually reproduced only during the respective keying "on" of the kinescopes. By this method high level signal distribution has been achieved in contrast to the relatively low signal distribution system of Figure 2. It is apparent that in both the high and low level signal distribution systems of Figures 2 and 3 respectively, multiplex demodulation of the applied signal is accomplished. For further consideration of the details of such high level distribution systems reference is directed to a pamphlet entitled "General Description of Receivers for the RCA Color Television System Which Employ the RCA Direct View Tri-Color Kinescopes" issued to the U. S. Federal Communications Commission in April 1950 by the Radio Corporation of America, RCA Laboratories Division.

Now, however, should the receiver of Figure 3 receive a standard black and white television signal, the following automatic circuit adjustments will occur. Since no burst is present to be delivered to the frequency comparator circuit, the diode 256 will no longer pass current.

The grid on the D.-C. amplifier 272 will then swing in a negative direction toward ground. The potential on the grid 274 of the buffer control tube 268 will then swing in a positive direction to render the tube 268 more conducting. This will bias the buffer amplifier 266 to cutoff and prevent oscillator voltage from reaching the keying pulse shaper 286. This means that without further means no keying pulses will be applied to the cathodes of the kinescopes **28*b*, 30*b* and 32*b* and hence no video information will be reproduced on the kinescope screens. However, in further accordance with the present invention conduction of the buffer control tube 268 will cause its anode potential to swing in a negative direction because of the voltage drop across resistor 314. Therefore the voltage applied to potentiometers 280, 282 and 284 will become less positive with respect to the point of datum potential or ground. The entire circuit is adjusted to make this positive going swing sufficient to render all of the kinescopes 28*b*, 30*b* and 32*b* conducting. Under these conditions the video signal produced by the video amplifier 316 will be simultaneously produced on the screens of all of the kinescopes. The potentiometers 280, 282 and 284** may be finely adjusted to produce the proper color balance necessary to get a suitable black and white picture.

It is interesting to note that the novel arrangement of the present invention has provided in Figure 3, separate means for adjusting the color balance and black-and-white balance of the receiver. The effect is similar to that provided by the arrangements in Figures 1 and 2. However, in Figure 3 the color balance is obtained by adjusting the gain of each of the pulse amplifiers individually. Adjustment of the gate pulse amplifiers allows individual adjustment of the amplitudes of each of the keying pulses 296, 298 and 300. The greater the amplitude of the gate pulse applied to the cathode of a given kinescope, the brighter will be the color record produced by that kinescope.

The advantages of the oscillator and buffer stopping circuits shown in Figures 2 and 3 of the drawings, in accordance with the present invention, are noteworthy. As described in Figure 2, the discharge tube 180 acts to conditionally disable the oscillator tube 162, while in Figure 3 the tube 268 acts to conditionally disable the buffer amplifier 266. Since, during the reception of a color signal, the television transmitter may quickly switch to black and white, for example, as when scanning film, phase control of the disabling circuits must be provided. Accordingly, the novel circuit of the present invention provides that a positive bias source be connected with the grids of each of the stopper tubes 180 and 268 in Figures 2 and 3, respectively. This bias source tends to establish the grids 178 and 274 of the stopper tubes positive with respect to the corresponding cathodes. This, in turn, means that the stopper tubes 180 and 268 are statically biased in a conductive direction. This is important for the reason that, during the presence of a burst and the non-conduction of the stopper tubes, oscillator voltage appearing across the cathode load impedance of the oscillator 162 in Figure 2 and buffer 266 in Figure 3 is rectified by the stopper tubes. This rectification acts to perpetuate a certain amount of the negative bias on the grids of the stopper tubes even in the absence of burst. Thus, should the transmitter cease transmission of a color signal, with its attendant burst, positive voltage applied to the grids of the stopper tubes will tend to overcome any negative bias produced by grid current on the stopper tubes caused by the positive oscillation peaks. This will then render the stopper tubes highly conductive and disable the signal distribution system of the receiver as desired.

Figure 4:
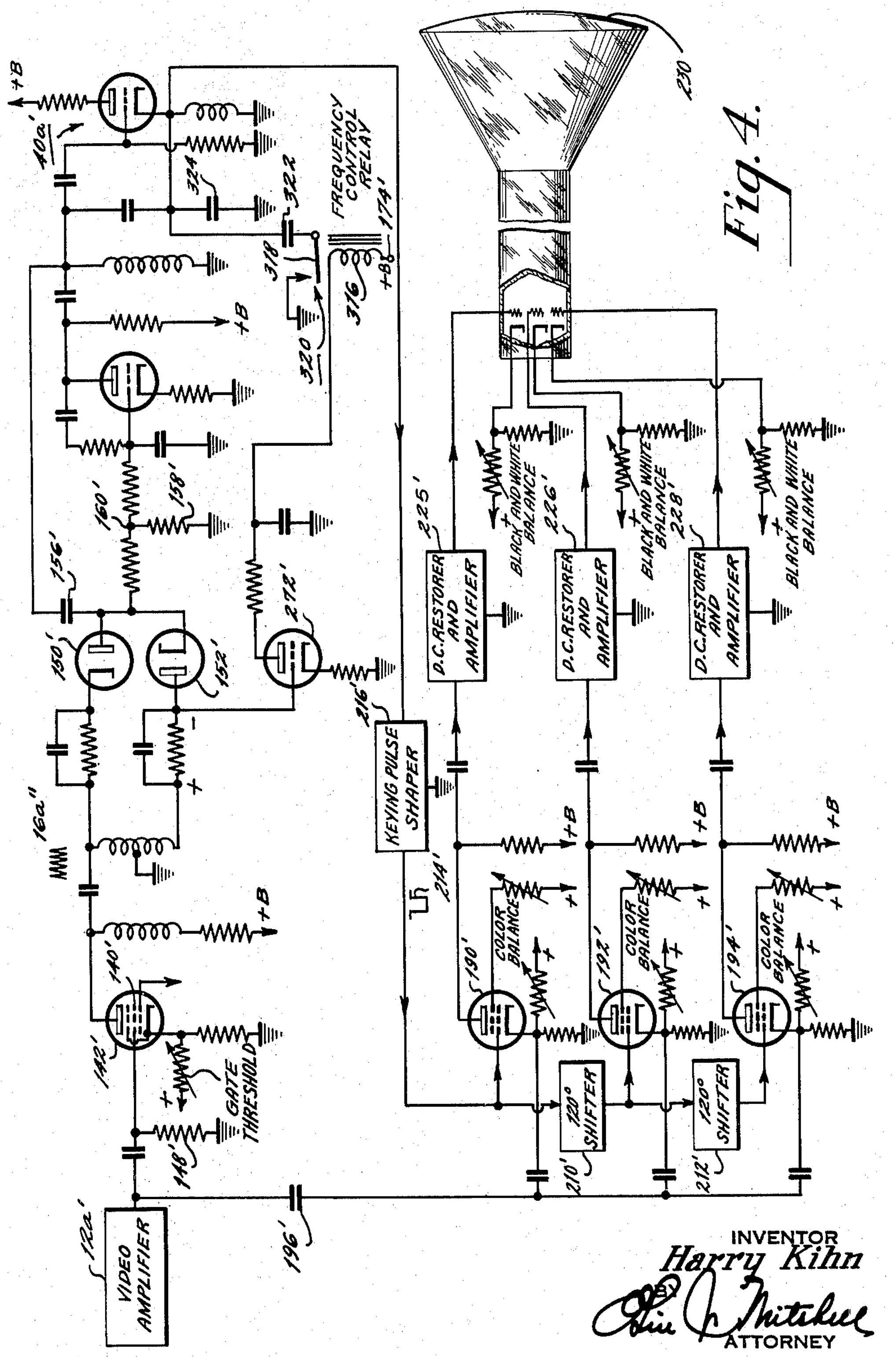
Figure 4 illustrates the block diagram and schematic representation of a still further form of the present invention as applied to a dot-multiplex color television receiver.

As mentioned hereinbefore, the time multiplexed signal distribution system of a dot multiplex television receiver may be effectively disabled by means other than actually stopping the signal distributing action. For example, in the embodiment of the invention shown in Figure 4, the signal distributing action of the television receiver is never stopped. The general circuitry of Figure 4 is practically identical to that of Figure 2 except that the oscillator stopper tube 180 of Figure 2 has been omitted. In lieu of the oscillator stopper tube, there is provided in Figure 4 a frequency control relay 316. The winding of the relay 316 is incorporated in the plate circuit of D.-C. amplifier tube 272′. The grid of the amplifier tube 272′ is connected with the frequency comparator diode 152′ in exactly the same manner as the corresponding amplifier tube 272 of Figure 3 is connected with the diode 256. When this relay is deactivated, the armature 318 touches the grounded contact 320 to place capacitor 322 across a portion of the oscillator tank circuit. It is further noted that in Figure 4 no means are provided for controlling the bias on the gate tubes 190′, 192′ and 194′ by the rectified burst wave in the manner shown for gate tubes 190, 192, and 194 in Figure 2. In other respects the circuitry of Figure 4 up to the image reproducing mechanism is identical to that of Figure 2 and like reference numerals have been used throughout, changed only by the adding of a prime (′) designation. In Figure 4, however, instead of using three separate color reproducing tubes whose screen images require optical mixing by some suitable device such as in Figure 1, a single color tube has been used. This tube contains three separate electron gun structures in a single envelope, each structure being adapted to excite a different color phosphor on the single composite color screen 230. A description of such a tube may be found in a pamphlet entitled "General Description of Receivers for the RCA Color Television System Which Employ the RCA Direct View Tri-Color Kinescopes" issued to the U. S. Federal Communications Commission in April 1950 by the Radio Corporation of America, RCA Laboratories Division.

The operation of the embodiment of Figure 4 depends upon the fact that the video amplifiers 225′, 226′ and 228′ all have an upper cutoff frequency, lying outside the video signal range. This is typical of all video amplifier circuits. Now then, during the reception of a color signal, the voltage applied to the grid of D.-C. amplifier tube 272′ will assume some negative value with respect to ground. This effect is substantially the reverse of that described in connection with Figure 3 wherein the lower diode 256 thereof is poled oppositely to that of diode 152′ in Figure 4. Current through the diode 152′ in Figure 4 will cause the anode thereof to assume a negative potential with respect to ground. By proper proportioning of circuit constants this negative swing is made sufficient to reduce the current flow in the amplifier tube 272′ to a value allowing the relay 316 to de-energize. The armature 318 will then touch the contact 320 to place the capacitor 322 in shunt with the already existing capacity 324 of the Colpitts oscillator. The values of capacitors 322 and 324 are so adjusted as to cause the oscillator **40*a*′ to operate at the required 3.6 megacycles for color reception. Keying pulses are consequently applied at the proper frequency to the gates 190′, 192′ and 194′ for color picture reproduction on the color screen 230**.

In the absence of a dot multiplex color television signal having a burst component, the embodiment of Figure 4 automatically adjusts itself in the following manner. The grid of the D.-C. amplifier 272′ swings positively towards ground potential since no burst is present to be rectified by the diode 152′. This allows greater current conduction through the tube 272′ and energizes the relay 316 to open contact 320. This in turn reduces the net capacity across the tank circuit of the oscillator **40*a*′ and allows its frequency to increase to some predetermined value. According to the present invention, this predetermined value is, for example, made at a frequency above the upper cutoff frequencies of the amplifiers 225′, 226′ and 228′**. Thus, although an incoming standard black and white television signal will be effectively chopped up by the signal distributing system including gate tubes 190′, 192′ and 194′, the frequency of chopping will not be passed by the video amplifiers feeding the kinescopes. Under these conditions, no interference patterns can appear. Hence, for all practical purposes, the signal distributing system of the television receiver has been disabled in the sense that its frequency of distribution is not passed by the video amplifiers 225′, 226′ and 228′. Immediately upon receiving a color signal having a burst component, the relay 316 will then be de-energized and decrease the frequency of the oscillator 40a′ to the required 3.6 megacycles to which the video amplifiers are responsive. If the amplifier had a trap in it at some point in the video signal range, it would be feasible to shift the oscillator frequency to that of the trap, during reception of black and white signals.

In the foregoing description of useful embodiments of the present invention, particular attention has been paid to color television receiving systems. It is obvious, of course, that the principles herein described have applications to other types of time division multiplexing systems in which it is desired to occasionally receive single channel non-multiplexed signals without having them adversely affected by time division signal distribution. It is moreover apparent that other characteristics of the incoming signals could be relied upon for determining whether or not the received signal was of the multiplexed or non-multiplexed variety.

For example, in the application of the present invention, to dot multiplex color television reception, one need not rely wholly upon the absence or presence of burst rectification information for determining when to effectively disable the signal distribution system. Since a multiplexed signal is made up of a number of discrete information groups having a certain repetition rate, it is obvious that a tuned circuit responsive to this rate could be used in lieu of the burst rectifier shown above. Still other means could be used for differentiating between multiplex and non-multiplex signals and the resulting information used to actually or effectively disable the signal distribution system of the receiving apparatus.

It is to be further understood that though the forms of the invention in Figures 1, 2 and 3 have been shown in connection with a color television system using three separate image reproducing devices, the utility of the invention is in no way limited thereto. As shown for example in Figure 4, any receiving apparatus for assembling or transforming the signal information appearing at the output of the multiplex distributor of the receiver into a visible image can benefit from the advantages provided by the present invention.

What is claimed:

1. In a television receiver adapted to receive a composite color signal including a color component and a control component, said color component comprising a plurality of video signals respectively representative of the colors of a subject, said video signals having a given color recurrence frequency and respectively having mutually distinguishing phases relative to said control component, and said control component comprising a burst of several cycles of a wave having said color recurrence frequency, the combination including: means operable to derive said color component from said composite color signal; means controlled by said control component burst for producing a wave having said color recurrence frequency; means for employing said wave to control the operation of said signal deriving means; and means controlled by said control component burst for rendering said signal deriving means operable.

2. In a television receiver adapted to receive either a monochrome signal representative of the black and white content of a subject or a composite color signal including a color component and a control component, said color component comprising a plurality of video signals respectively representative of the colors of a subject, said video signals having a given color recurrence frequency and respectively having mutually distinguishing phases relative to said color component, and said control component comprising a burst of several cycles of a wave having said color recurrence frequency, the combination including: signal receiving means to receive either said monochrome signal or said composite color signal; means including image-reproducing apparatus having a given mode of operation in response to said monochrome signal to produce a black and white image; means controlled by said control component burst for producing a wave having said color recurrence frequency; and means controlled by said control component burst present in said signal receiving means during the reception of said color signal for effecting operation of said means including image-reproducing apparatus in another mode under the control of said wave to produce a color image in response to said color representative component.

3. In a television receiver adapted to receive either a monochrome signal representative of the black and white content of a subject or a composite color signal including a color component and a control component, said color component comprising a plurality of video signals respectively representative of the colors of a subject, said video signals having a given color recurrence frequency and respectively having mutually distinguishing phases relative to said color component, and said control component comprising a burst of several cycles of a wave having said color recurrence frequency, the combination including: signal receiving means to receive either said monochrome signal or said composite color signal; means controlled by said control component burst for producing a wave having said color recurrence frequency; means including image-reproducing apparatus having a given mode of operation controlled by said wave to produce a color image; and means controlled by said control component burst present in said signal receiving means during the reception of said color signal for effecting said given mode of operation of said means including image-reproducing apparatus, said last-named means being controlled during the reception of said monochrome signal to effect operation of said means including image-reproducing apparatus in another mode to produce a black and white image in response to said monochrome signal.

4. In a television receiver adapted to receive either a monochrome signal representative of the black and white content of a subject or a composite color signal including a color component and a control component, said color component comprising a plurality of video signals respectively representative of the colors of a subject, said video signals having a given color recurrence frequency and respectively having mutually distinguishing phases relative to said color component, and said control component comprising a burst of several cycles of a wave having said color recurrence frequency, the combination including: signal receiving means to receive either said monochrome signal or said composite color signal; means including image-reproducing apparatus and associated control circuits for reproducing an image, said control circuits being coupled to said signal receiving means and including signal processing apparatus having a given mode of operation such as to operate said image-reproducing apparatus in a manner to produce a black and white image in response to said monochrome signal; means controlled by said control component burst for producing a wave having said color recurrence frequency; and means coupled to said signal receiving means and controlled by said control component burst present in said signal receiving means during the reception of said color signal for effecting operation of said control circuit apparatus in another mode under the control of said wave such as to operate said image-reproducing apparatus in a manner to produce a color image in response to said color representative component.

5. In a television receiver adapted to receive either a monochrome signal representative of the black and white content of a subject or a composite color signal including a color component and a control component, said color component comprising a plurality of video signals respectively representative of the colors of a subject, said video signals having a given color recurrence frequency and respectively having mutually distinguishing phases relative to said color component, and said control component comprising a burst of several cycles of a wave having said color recurrence frequency, the combination including: signal receiving means to receive and produce in its output either said monochrome signal or said composite color signal; means including image-reproducing apparatus and associated control circuits for reproducing an image, said control circuits including signal translating apparatus; means coupling the output of said signal receiving means to said control circuits for impressing either said monochrome signal or said composite color signal upon said signal translating apparatus; means controlled by said control component burst in the output of said signal receiving means during the reception of said color signal to adapt said signal translating apparatus to a first mode of operation; means controlled by said control component burst for developing a color controlling wave having said color recurrence frequency; means for impressing said color controlling wave upon said signal translating apparatus while operating in said first mode for combination with said color component signal in such a manner as to effect the operation of said image-reproducing apparatus suitably to produce a color image, said last-named means being controlled during reception of said monochrome signal in a manner to adapt said signal translating apparatus to a second mode of operation for response to said monochrome signal while operating in said second mode in such a manner as to effect the operation of said image-reproducing apparatus suitably to produce a black and white image.

6. In a television receiver adapted to receive either a monochrome signal representative of the black and white content of a subject or a composite color signal including a color component and a control component, said color component comprising a plurality of video signals respectively representative of the colors of a subject, said video signals having a given color recurrence frequency and respectively having mutually distinguishing phases relative to said color component, and said control component comprising a burst of several cycles of a wave having said color recurrence frequency, the combination including: signal receiving means to receive and produce in its output either said monochrome signal or said composite color signal; reproducing means adapted to produce either color or black and white images in response to subject representative video signals; means controlled by said control component burst present in the output of said signal receiving means during the reception of said color signal for deriving said color representative signals from said composite color signal; a plurality of similar signal conveying circuits coupling said signal deriving means to said reproducing means to supply video signals to said reproducing means, there being a signal conveying circuit for each of the component colors in which said color image is to be produced; and means operative during the reception of said monochrome signal to adapt said color representative video signal deriving means to impress said monochrome signal upon said signal conveying circuit in suitable respective proportions to produce a black and white image.

7. In a television receiver adapted to receive either a monochrome signal representative of the black and white content of a subject or a composite color signal including a color component and a control component, said color component comprising a plurality of video signals respectively representative of the colors of a subject, said video signals having a given color recurrence frequency and respectively having mutually distinguishing phases relative to said color component, and said control component comprising a burst of several cycles of a wave having said color recurrence frequency, the combination including: signal receiving means to receive and produce in its output either said monochrome signal or said composite color signal; reproducing means adapted to produce either color or black and white images in response to video signals representative of said images; means operable for deriving said color representative video signals from said composite color signal; a plurality of similar color controlling circuits coupled to said reproducing means to supply image representative video signals impressed thereon to said reproducing means, there being a color controlling circuit for each of the component colors in which said color image is to be produced; means controlled by said control component burst present in the signal produced in the output of said signal receiving means to effect the operation of said color representative video signal deriving means so as to impress said derived color representative video signals upon said respective color controlling circuits to produce a color image; and means operative during the reception of said monochrome signal for modifying the operation of said color representative video signal deriving means to impress said monochrome signal upon each of said color controlling circuits to produce a black and white image.

8. In a television receiver adapted to receive either a monochrome signal representative of the black and white content of a subject or a composite color signal including a color component and a control component, said color component comprising a pluralit yof video signals respectively representative of the colors of a subject, said video signals having a given color recurrence frequency and respectively having mutually distinguishing phases relative to said color component, and said control component comprising a burst of several cycles of a wave having said color recurrence frequency, the combination including: signal receiving means to receive and produce in its output either said monochrome signal or said composite color signal; reproducing means adapted to produce either color or black and white images in response to video signals representative of said images; means operable for deriving said color representative signals from said composite color signal; a plurality of similar color controlling circuits coupled to said reproducing means to supply image representative video signals impressed thereon to said reproducing means, there being a color controlling circuit for each of the component colors in which said color image is to be produced; means controlled by said control component burst present in the signal produced in the output of said signal receiving means to effect the operation of said color representative video signal deriving means so as to impress said derived color representative video signals upon said respective color controlling circuits to produce a color image; means operative during the reception of said monochrome signal for so altering the operation of said color representative video signal deriving means as to impress said monochrome signal upon each of said color controlling circuits to produce a black and white image; and means connected to said color controlling circuits and to said reproducing means to suitably control the background illumination intensity of both said color and black and white produced images.

9. In a television receiver adapted to receive either a monochrome signal representative of the black and white content of a subject or a composite color signal including a color component and a control component, said color component comprising a plurality of video signals respectively representative of the colors of a subject, said video signals having a given color recurrence frequency and respectively having mutually distinguishing phases relative to said control component, and said control component comprising a burst of several cycles of a wave having said color recurrence frequency, the combination including: means adapted to derive said video signals from said composite color signal; means including a source of local oscillations having said color recurrence frequency to control the operation of said signal-deriving means; a phase detector responsive to said control component burst and to said local oscillations for synchronously controlling said source of oscillations; means for deriving from said phase detector indicating signals indicative respectively of the presence or absence of said control burst; and means responsive to said indicating signals for rendering said signal-deriving means operative in the presence of said control burst or effectively inoperative in the absence of said control burst.

10. In a television receiver adapted to receive either a monochrome signal representative of the black and white content of a subject or a composite color signal including a color component and a control component, said color component comprising a plurality of video signals respectively representative of the colors of a subject, said video signals having a given color recurrence frequency and respectively having mutually distinguishing phases relative to said control component, and said control component comprising a burst of several cycles of a wave having said color recurrence frequency, the combination including: means adapted to derive said video signals from said composite color signal; said signal-deriving means including a signal-conveying element adapted to be operated in a state of signal conduction or in a state of signal non-conduction; means for impressing said composite color signal upon said signal-conveying element; means including a source of local oscillations having said color recurrence frequency to control the operation of said signal-deriving means; means responsive to said control component burst for synchronously controlling said source of oscillations; means responsive to the presence of said control burst to condition said signal-conveying element to one of said states for rendering said signal-deriving means operative; and means responsive to the absence of said control burst to condition said signal-conveying element to the other of said states for rendering said signal-deriving means effectively inoperative in the absence of said control burst.

11. In a television receiver adapted to receive either a monochrome signal representative of the black and white content of a subject or a composite color signal including a color component and a control component, said color component comprising a plurality of video signals respectively representative of the colors of a subject, said video signals having a given color recurrence frequency and respectively having mutually distinguishing phases relative to said control component, and said control component comprising a burst of several cycles of a wave having said color recurrence frequency, the combination including: means adapted to derive said video signals from said composite color signal; said signal-deriving means including at least one electron tube having an input circuit; means for impressing said composite color signal upon the input circuit of said electron tube; means including a source of local oscillations having said color recurrence frequency to control the operation of said signal-deriving means; a phase detector responsive to said control component burst and to said local oscillations for synchronously controlling said source of oscillations; means for deriving from said phase detector indicating signals indicative respectively of the presence and absence of said control burst; and means responsive to said indicating signals for biasing said electron tube to one state of conduction to render said signal-deriving means operative in the presence of said control burst and for biasing said electron tube to another state of conduction to render said signal-deriving means effectively inoperative in the absence of said control burst.

12. In a television receiver adapted to receive and demodulate a time division multiplexed color television signal including a video component of the type comprising sets of several successively recurring signal information sections each representing brightness varations of a different component color in the televised scene, said signal also including a periodically recurring synchronizing component having a parameter indicating the timing of the multiplexing by which the video component of said color television signal was produced, the combination including: a time division multiplexed signal distribution system having an input terminal; means for applying said received demodulated color television signals to said distribution system input terminal; means responsive to the periodically recurring presence or sustained absence of the synchronizing component of said received signals to produce a correspondingly indicative control signal; and means responsive to said control signal for controlling the distribution action of said distribution system in one manner when said control signal indicates the presence of said synchronizing component and in another manner when said control signal indicates the absence of said synchronizing component.

13. In a television receiver adapted to receive and demodulate a time division multiplexed color television signal including a video component of the type comprising sets of several successively recurring signal information sections each representing brightness variations of a different component color in the televised scene, said signal also including a periodically recurring synchronizing component having a parameter indicating the timing of the multiplexing by which the video component of said color television signal was produced, the combination including: a time division multiplexed signal distribution system having an input terminal; means for applying said received demodulated color television signal to said distribution system input terminal; means responsive to the periodically recurring presence or sustained absence of the synchronizing component of said received signals to produce a correspondingly indicative control signal; and means responsive to said control signal for effectively disabling said distribution system when said control signal indicates the absence of said synchronizing component.

14. A time multiplex receiving apparatus for accepting and time distributing a time division multiplexed signal to a plurality of utilization means, said multiplexed signal having a periodically recurring non-multiplexed control component, said receiving apparatus comprising in combination: a time division multiplexed signal distribution system having an input terminal and operative at a controlled distribution rate; means for applying said multiplexed signal to said distribution system input terminal; means responsive to the periodically recurring presence or sustained absence of said non-multiplexed control component to develop a correspondingly indicative control voltage; and means responsive to said control voltage to effectively disable said distribution system when said control voltage indicates the absence of said control component.

15. A time multiplex receiving apparatus for accepting and time distributing a time division multiplexed signal to a plurality of separate channel utilization means, said multiplexed signal including a synchronous frequency component synchronously related to the multiplexing rate of the received multiplexed signal, said receiving apparatus comprising in combination: means responsive to the synchronous frequency component of said received multiplexed signal to develop a control potential having different characteristics respectively indicative of the presence or absence of said received multiplexed signal; a time division multiplexed signal distribution system having an input terminal and which is operative at a controlled distribution rate; means for applying said multiplexed signal to said distribution system input terminal; means responsive to said developed control potential for controlling the distribution action of said distribution system; and means for applying said developed control potential to said controlling means in such electrical sense as to effectively disable said distribution system in the absence of said received multiplexed signal.

16. In a television receiver adapted to receive and demodulate a time division multiplexed color television signal including a video component of the type comprising sets of several successively recurring signal information sections each representing brightness variations of a different component color in the televised scene, said color television signal also including a synchronizing component having a frequency indicating the timing of the multiplexing by which the video component of said color television signal was produced, the combination including: a time division multiplexed signal distribution system adapted to accept and time distribute said demodulated color television signal to a plurality of separate color reproducing channels; a control oscillator developing a timing signal; means for impressing said timing signal upon said signal distribution system to synchronize its operation with said received multiplexed signal; means responsive to the frequency of the received synchronizing component for controlling the frequency of said control oscillator; and means coupled with said control oscillator and responsive to a predetermined amplitude of said received synchronizing component for interrupting the impression of said timing signal upon said signal distribution system.

17. In a television receiver adapted to receive and demodulate a time division multiplexed color television signal, said signal including a control component, the combination including: means responsive to said color telveision signal for reproducing a plurality of separate color images corresponding to color information represented by said color television signal; means connected with said reproducing means for variably controlling the background illumination intensity of each color image; means responsive to the presence or absence of said control component to develop a correspondingly indicative control voltage; and means for applying said control voltage to said background controlling means so as to operate said background controlling means in one manner when said control voltage indicates the presence of said control component and in another manner when said control voltage indicates the absence of said control component.

18. In a television receiver adapted to receive and demodulate a time division multiplexed color television signal, said signal including a control component comprising bursts of a single frequency having a given relationship to the timing of the multiplexing of said color television signal, the combination including: means including a time division multiplex distribution system responsve to said color television signal for reproducing a plurality of separate color images corresponding to color information represented by said color television signal; means responsive to said control component bursts for applying a signal having the frequency of said bursts to control the distribution rate of said distribution system; means connected with said reproducing means for variably controlling the background illumination intensity of each color image; means responsive to the presence or absence of said control component to develop a correspondingly indicative control voltage; and means for applying said control voltage to said background controlling means so as to operate said background controlling means in one manner when said control voltage indicates the presence of said control component and in another manner when said control voltage indicates the absence of said control component.

19. A time multiplex receiving apparatus for accepting and time distributing a color television time division multiplexed signal to a plurality of utilization means, said multiplexed signal having a non-multiplexed control component, said receiving apparatus comprising in combination: a time division multiplexed signal distribution system having an input terminal; means for applying said multiplexed signals to said distribution system input terminal; means responsive to the presence or absence of said non-multiplexed control component to develop a correspondingly indicative control voltage; means for applying said control voltage to said distribution controlling means in such electrical sense as to render operative said distribution system when said control voltage indicates the presence of said control component and to effectively disable said distribution system when said control voltage indicates the absence of said control component; means to produce a plurality of color images in response to color information represented by said color signals; manual means coupled to said image producing means for adjusting the intensity of each color image to predetermined values during operation of said distribution system; and automatic means responsive to said control voltage and coupled to said image producing means for altering the illumination intensity of each color image during non-operation of said distribution system.

20. In a color television receiver adapted to receive and demodulate a composite television signal including a color video signal component and a periodic burst component, said bursts being each a number of cycle of a single frequency, the combination including: image reproducing means responsive to said color video signal component for visually reconstructing a television scene; means responsive to a control voltage and coupled with said reproducing device for defining the average illumination intensity of the reconstructed scene; means for converting said periodic burst component of the television signal to a control voltage indicative of a characteristic of said burst component; and means for applying said control voltage to said illumination intensity control means, whereby to control the illumination intensity of said scene in accordance with said characteristic of said burst component.

References Cited in the file of this patent

UNITED STATES PATENTS

| | | |
|---|---|---|
| 2,313,238 | Holcomb | Mar. 9, 1943 |
| 2,431,115 | Goldsmith | Nov. 18, 1947 |
| 2,464,393 | Heim | Mar. 15, 1949 |
| 2,469,227 | Fraser | May 3, 1949 |
| 2,480,571 | Goldmark | Aug. 30, 1949 |
| 2,513,159 | Fredendall | June 27, 1950 |
| 2,520,170 | Ransom | Aug. 29, 1950 |
| 2,567,040 | Sziklai | Sept. 4, 1951 |
| 2,618,703 | Lowman | Nov. 18, 1952 |
| 2,632,046 | Goldberg | Mar. 17, 1953 |